US011821370B2

(12) United States Patent
Pal

(10) Patent No.: US 11,821,370 B2
(45) Date of Patent: Nov. 21, 2023

(54) COOLING SYSTEM FOR TAIL CONE MOUNTED GENERATOR

(71) Applicant: Hamilton Sundstrand Corporation, Charlotte, NC (US)

(72) Inventor: Debabrata Pal, Hoffman Estates, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/529,625

(22) Filed: Nov. 18, 2021

(65) Prior Publication Data
US 2023/0151771 A1    May 18, 2023

(51) Int. Cl.
| F02C 7/32 | (2006.01) |
| B64D 27/20 | (2006.01) |
| F01D 15/10 | (2006.01) |
| F02C 7/18 | (2006.01) |
| F01D 25/28 | (2006.01) |
| B64D 41/00 | (2006.01) |

(52) U.S. Cl.
CPC ............. *F02C 7/32* (2013.01); *B64D 27/20* (2013.01); *F01D 15/10* (2013.01); *F01D 25/28* (2013.01); *F02C 7/18* (2013.01); *B64D 2041/002* (2013.01); *F05D 2220/323* (2013.01); *F05D 2220/50* (2013.01); *F05D 2220/76* (2013.01)

(58) Field of Classification Search
CPC ......... B64D 27/14; B64D 27/20; F01D 15/10; F01D 25/14; F02C 7/12; F02C 7/18; F02C 7/32; F05D 2220/76; F05D 2260/234
See application file for complete search history.

(56) References Cited

U.S. PATENT DOCUMENTS

| 9,003,811 | B2 | 4/2015 | Barnett et al. |
| 9,097,134 | B2 | 8/2015 | Ferch et al. |
| 10,801,410 | B2 | 10/2020 | Roberge |
| 2012/0112578 | A1* | 5/2012 | Telakowski ............. H02K 1/32 310/64 |
| 2014/0037437 | A1* | 2/2014 | Wood ...................... F02K 3/075 29/888.025 |
| 2017/0284303 | A1* | 10/2017 | Johnson ................... F02C 7/18 |

(Continued)

FOREIGN PATENT DOCUMENTS

| CA | 2809356 C | 3/2020 | |
| WO | WO-2021014667 A1 * | 1/2021 | ............... F02C 7/12 |

OTHER PUBLICATIONS

English translation of WO2021014667 (Year: 2021).*
European Application No. 22200961.5 filed Oct. 11, 2022; Extended European Search Report dated Apr. 11, 2023; 6 pages.

*Primary Examiner* — Scott J Walthour
(74) *Attorney, Agent, or Firm* — CANTOR COLBURN LLP

(57) ABSTRACT

An engine system includes an engine duct and a tail cone arranged radially inwardly of the engine duct. The tail cone has an outer surface and an inner surface. A generator housing is arranged in the tail cone. The generator housing includes an outer surface portion spaced from the inner surface of the tail cone. A generator is mounted in the generator housing. An air duct extends from the generator, through the generator housing, through the tail cone, and through the engine duct. The air duct includes an opening exposed to an air stream passing over the engine duct.

16 Claims, 6 Drawing Sheets

(56) References Cited

U.S. PATENT DOCUMENTS

2019/0316486 A1* 10/2019 Roberge ................ H02K 7/116
2021/0281145 A1    9/2021 Lemmers, Jr.
2021/0324799 A1* 10/2021 Suzuki ................... B64D 41/00

* cited by examiner

COOLING SYSTEM FOR TAIL CONE MOUNTED GENERATOR

BACKGROUND

Exemplary embodiments pertain to the art of aircraft and, more particularly, to a cooling system for a tail cone mounted generator in an aircraft.

Many modern jet aircraft include generators that are driven by a turbine engine. The generator may be operated to provide electrical power to various aircraft systems. In many cases, the generator is driven by a shaft connected to a low pressure spool of the turbine engine. In some cases, the generator may be co-located with the turbine engine in a nacelle. During operation of the turbine engine and the generator a significant heat load is generated in the nacelle. A cooling system is employed to ensure operational integrity of the generator.

Typically, the cooling system relies on a liquid heat exchange medium, such as water or oil, that is passed through the generator. Liquid based cooling systems typically require support systems such as reservoirs, pumps, heat exchangers and the like. Further, flowing a liquid coolant between various members of a generator may reduce operating efficiency stemming from windage losses. In addition, generators are built to contain the liquid, typically oil, without leaking.

BRIEF DESCRIPTION

Disclosed in accordance with a non-limiting example, is an engine system including an engine duct and a tail cone arranged radially inwardly of the engine duct. The tail cone has an outer surface and an inner surface. A generator housing is arranged in the tail cone. The generator housing includes an outer surface portion spaced from the inner surface of the tail cone. A generator is mounted in the generator housing. An air duct extends from the generator, through the generator housing, through the tail cone, and through the engine duct. The air duct includes an opening exposed to an air stream passing over the engine duct.

Additionally, or alternatively, in this or other non-limiting examples, another air duct extends from the generator, through the generator housing, through the tail cone, and through the engine housing, the another air duct including another opening exposed to an air stream passing over the engine duct.

Additionally, or alternatively, in this or other non-limiting examples, the air duct comprises an inlet duct for directing an air flow into the generator housing and the another air duct comprises an outlet air duct for directing the air flow out from the generator housing.

Additionally, or alternatively, in this or other non-limiting examples, a plenum is defined between the outer surface portion of the generator housing and the inner surface of the tail cone.

Additionally, or alternatively, in this or other non-limiting examples, the outlet duct is fluidically connected to the plenum.

Additionally, or alternatively, in this or other non-limiting examples, the generator includes a drive shaft connectable to a low pressure spool of a turbine engine, the drive shaft having a hollow interior fluidically connected to the plenum through an outlet passage.

Additionally, or alternatively, in this or other non-limiting examples, the opening of the air duct faces a first direction relative to the engine duct and the another opening of the another air duct faces a second direction that is distinct from the first direction.

Additionally, or alternatively, in this or other non-limiting examples, the first direction is directly opposite the second direction.

Additionally, or alternatively, in this or other non-limiting examples, a plurality of electrical conductors connected to the generator, the plurality of electrical conductors pass from the generator through the air duct.

Also disclosed, in accordance with a non-limiting example, is an aircraft including a fuselage, a wing supported by the fuselage, and an engine system supported by the fuselage. The engine system includes a nacelle surrounding an engine including an engine duct. A tail cone is arranged radially inwardly of the engine duct. The tail cone has an outer surface and an inner surface. A generator housing is arranged in the tail cone. The generator housing includes an outer surface portion spaced from the inner surface of the tail cone. A generator is mounted in the generator housing. An air duct extends from the generator, through the generator housing, through the tail cone, and through the engine duct. The air duct includes an opening exposed to an air stream passing over the engine duct.

Additionally, or alternatively, in this or other non-limiting examples, another air duct extends from the generator, through the generator housing, through the tail cone, and through the engine housing, the another air duct including another opening exposed to an air stream passing over the engine duct.

Additionally, or alternatively, in this or other non-limiting examples, the air duct comprises an inlet duct for directing an air flow into the generator housing and the another air duct comprises an outlet air duct for directing the air flow out from the generator housing.

Additionally, or alternatively, in this or other non-limiting examples, a plenum is defined between the outer surface portion of the generator housing and the inner surface of the tail cone.

Additionally, or alternatively, in this or other non-limiting examples, the outlet duct is fluidically connected to the plenum.

Additionally, or alternatively, in this or other non-limiting examples, the generator includes a drive shaft connectable to a low pressure spool of a turbine engine, the drive shaft having a hollow interior fluidically connected to the plenum through an outlet passage.

Additionally, or alternatively, in this or other non-limiting examples, the opening of the air duct faces a first direction relative to the engine duct and the another opening of the another air duct faces a second direction that is distinct from the first direction.

Additionally, or alternatively, in this or other non-limiting examples, the first direction is directly opposite the second direction.

Additionally, or alternatively, in this or other non-limiting examples, a plurality of electrical conductors is connected to the generator, the plurality of electrical conductors pass from the generator through the air duct.

Additionally, or alternatively, in this or other non-limiting examples, the engine system is supported in a nacelle mounted to the fuselage.

Additionally, or alternatively, in this or other non-limiting examples, the wing is fixedly mounted to the fuselage.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
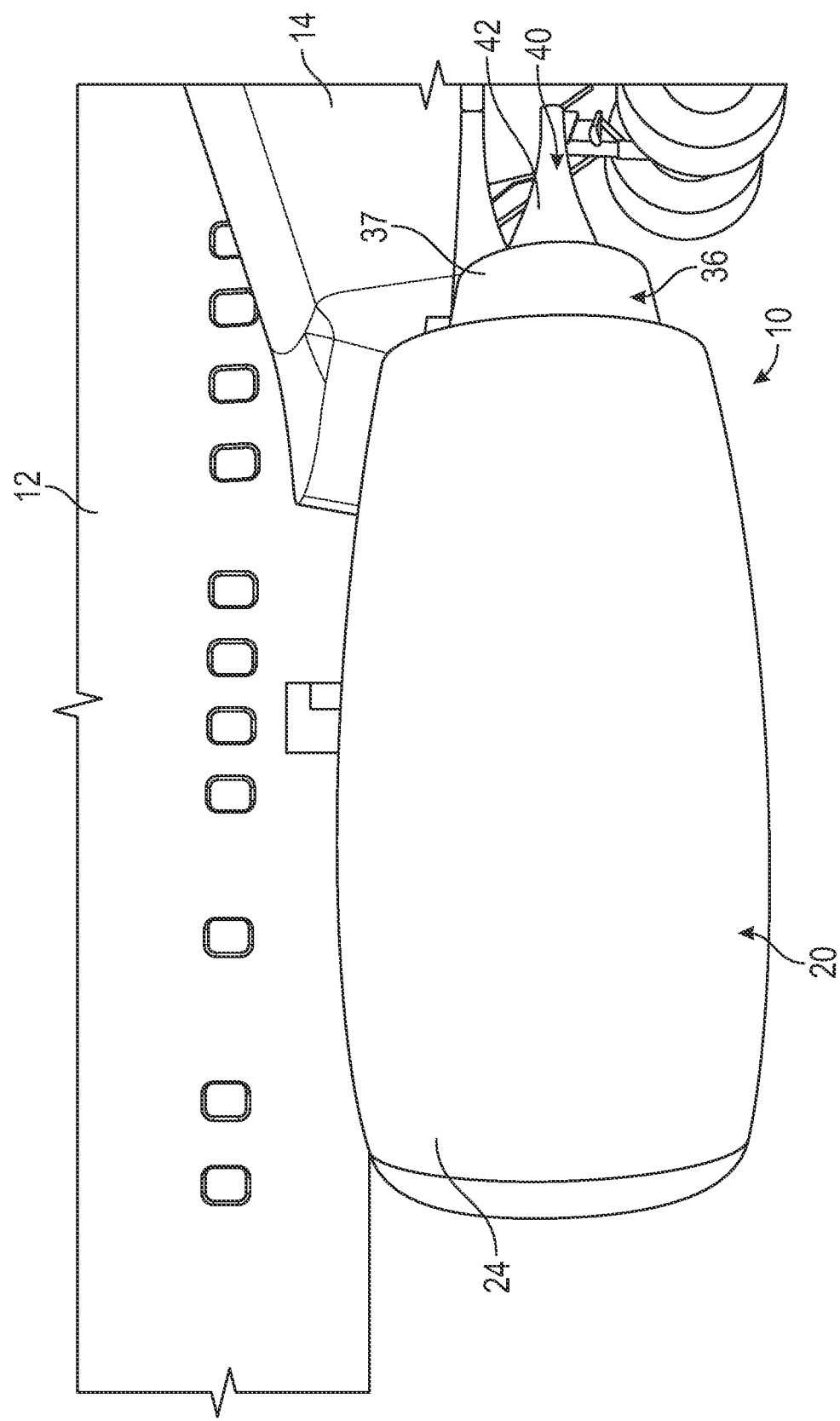
FIG. 1 is a partial side view of an aircraft including a cooling system for a tail cone mounted generator, in accordance with a non-limiting example.
Figure 2:
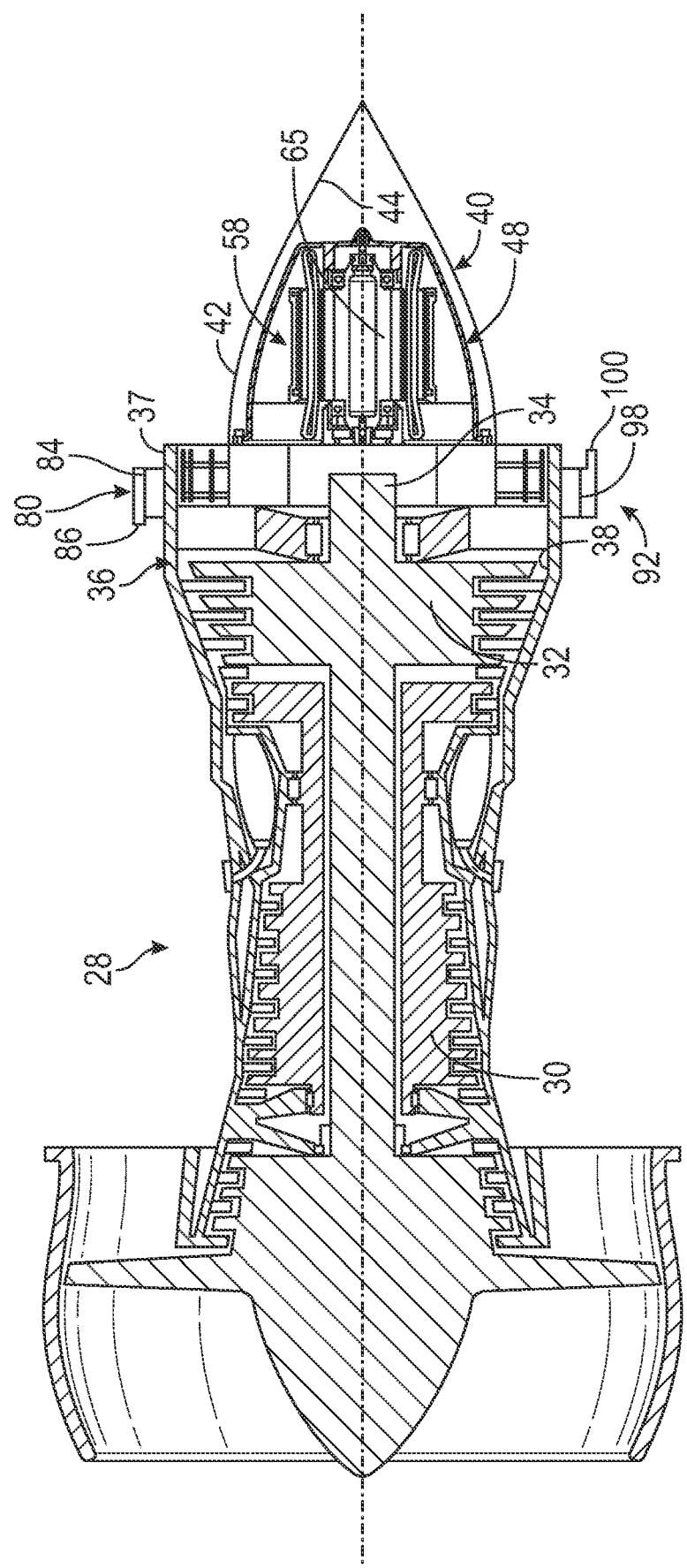
FIG. 2 depicts a cross-sectional side view of an engine of the aircraft of FIG. 1 including the cooling system for a tail cone mounted generator, in accordance with a non-limiting example.

An aircraft, in accordance with a non-limiting example, is indicated generally at 10 in FIG. 1. Aircraft 10 includes a fuselage 12 that supports a wing 14. An engine system 20 including a nacelle 24 is supported by wing 14. Nacelle 24 surrounds and protects engine system 20. At this point, it should be understood that engine system 20 may also be directly supported by fuselage 12 or be mounted to tail surfaces (not shown) of aircraft 10. Referring to FIG. 2, and with continued reference to FIG. 1, engine system 20 includes a turbine engine 28 supported within nacelle 24. Turbine engine 28 includes a high pressure spool 30 connected to a low pressure spool 32. A low pressure spool shaft 34 extends from low pressure spool 32. An engine duct 36 including an outer surface section 37 and an inner surface section 38 extends about turbine engine 28 and provides a pathway for air flow.

Figure 3:
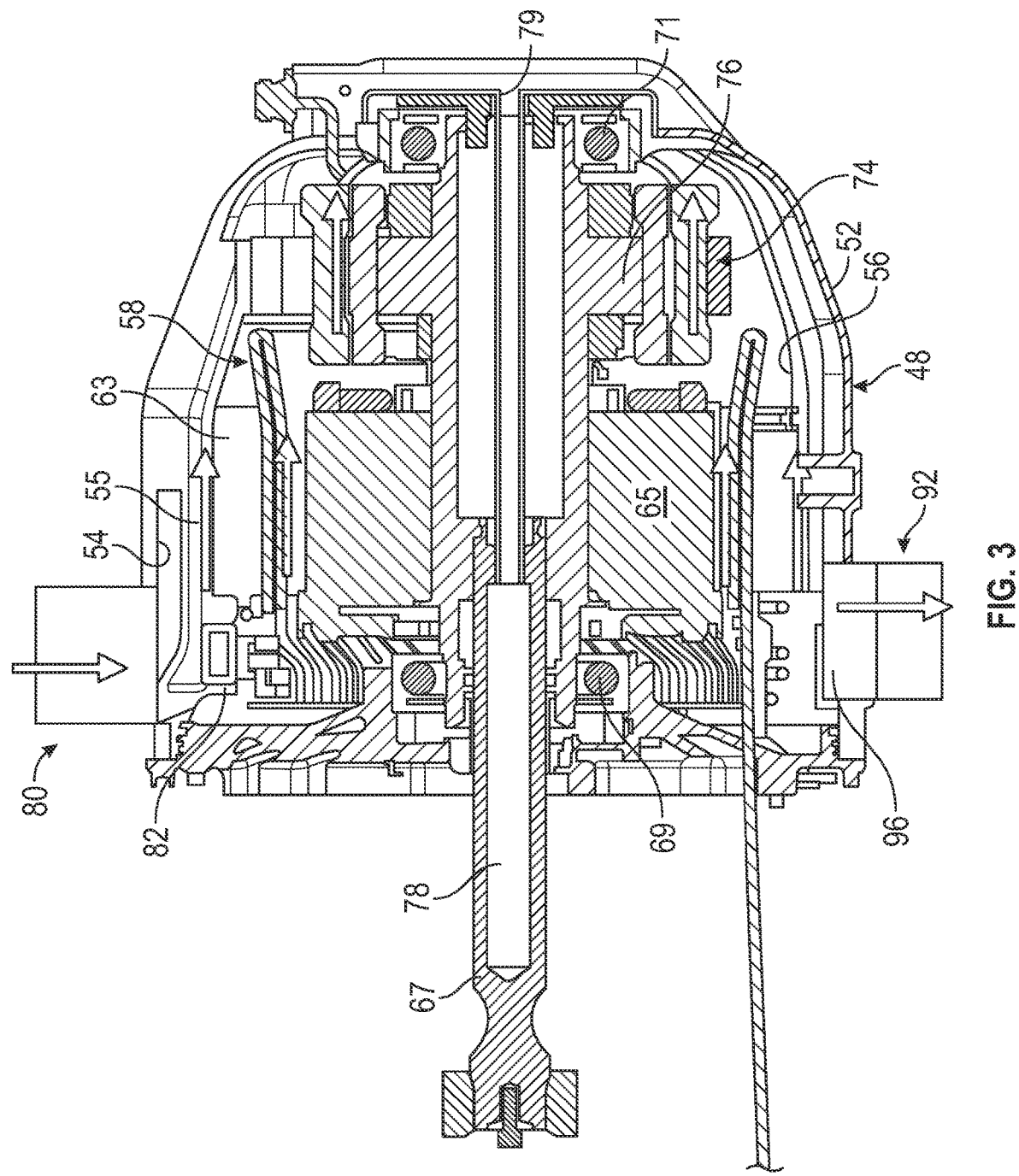
FIG. 3 depicts a cross-sectional side view of a tail cone mounted generator including a cooling system, in accordance with a non-limiting example.

In a non-limiting example, turbine engine 28 includes a tail cone 40 having an outer surface 42 and an inner surface 44. A generator housing 48 is arranged within tail cone 40. Referring to FIG. 3, generator housing 48 takes the form of a service frame (not separately labeled) having a first outer surface portion 52 and a first inner surface portion 54. A second outer surface portion 55 is spaced from first inner surface portion 54. A second inner surface portion 56 extends about a generator 58. A plenum 60 is defined between inner surface 44 and first outer surface portion 52.

In a non-limiting example, generator 58 includes a stator 63 including a stator winding (not separately labeled) supported by second inner surface portion 56. A rotor 65 including a rotor winding (also not separately labeled) is supported on a shaft 67 within stator 63. Shaft 67 is supported in generator housing 48 through a first bearing 69 and a second bearing 71. Generator 58 is also shown to include a secondary stator 74 axially spaced from stator 63. A second rotor 76 is supported on shaft 67 axially spaced from rotor 65 and is rotatable within secondary stator 74. Shaft 67 includes a hollow interior 78. Hollow interior 78 is fluidically connected to plenum 60 through an outlet passage 79 formed in generator housing 48.

Figure 4:
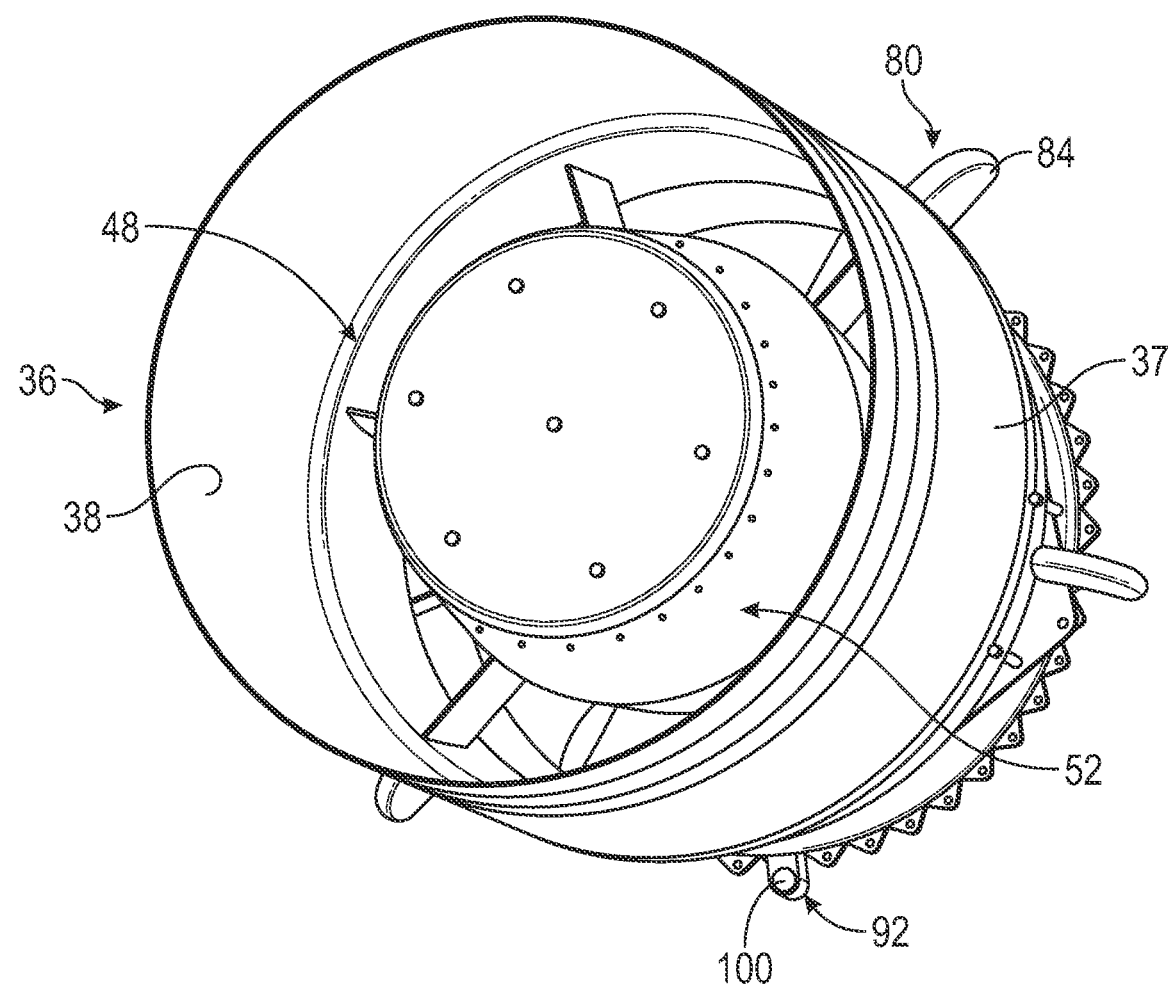
FIG. 4 depicts an axial end view of the tail cone mounted generator supported in an engine housing without the tail cone, in accordance with a non-limiting example.

In a non-limiting example, a first air duct 80 extends from within generator housing 48. First air duct 80 includes a first end 82 positioned inwardly of second inner surface portion 56 and a second end 84 (FIG. 2) that is positioned outwardly of engine duct 36 as shown in FIG. 2. First air duct 80 extends through generator housing, tail cone 40 and engine duct 36 with second end 84 being exposed to an air stream passing over turbine engine 28. That is, second end 84 of first air duct 80 includes an opening 86 that faces a first direction and defines an inlet (not separately labeled) that receives air flowing over turbine engine 28. The air passes through first air duct 80 and into generator housing 48. The air passes between rotor 65 and stator 63 as well as over stator 63. The air also passes between secondary stator 74 and second rotor 76. In a non-limiting example, portions of first air duct 80 that extend between tail cone 40 and engine duct 36 may include an aerodynamic profile as shown in FIG. 4.

In a non-limiting example, a second air duct 92 may extend from within generator housing 48. Second air duct 92 includes a first end section 96 that may be positioned between first outer surface portion 52 of generator housing 48 and inner surface 44 of tail cone 40 and a second end section 98 that is arranged outwardly of engine duct 36. Second end section 98 includes an opening 100 (FIG. 2) that faces a second direction opposite to that of opening 86 and defines an outlet. In this manner, air that has exchanged heat with internal components of generator 58 may be expelled into tail cone 40, through second air duct 92, and into an airstream passing over turbine engine 28. At this point, it should be understood that the number, orientation, and circumferential location of air ducts may vary.

Figure 5:
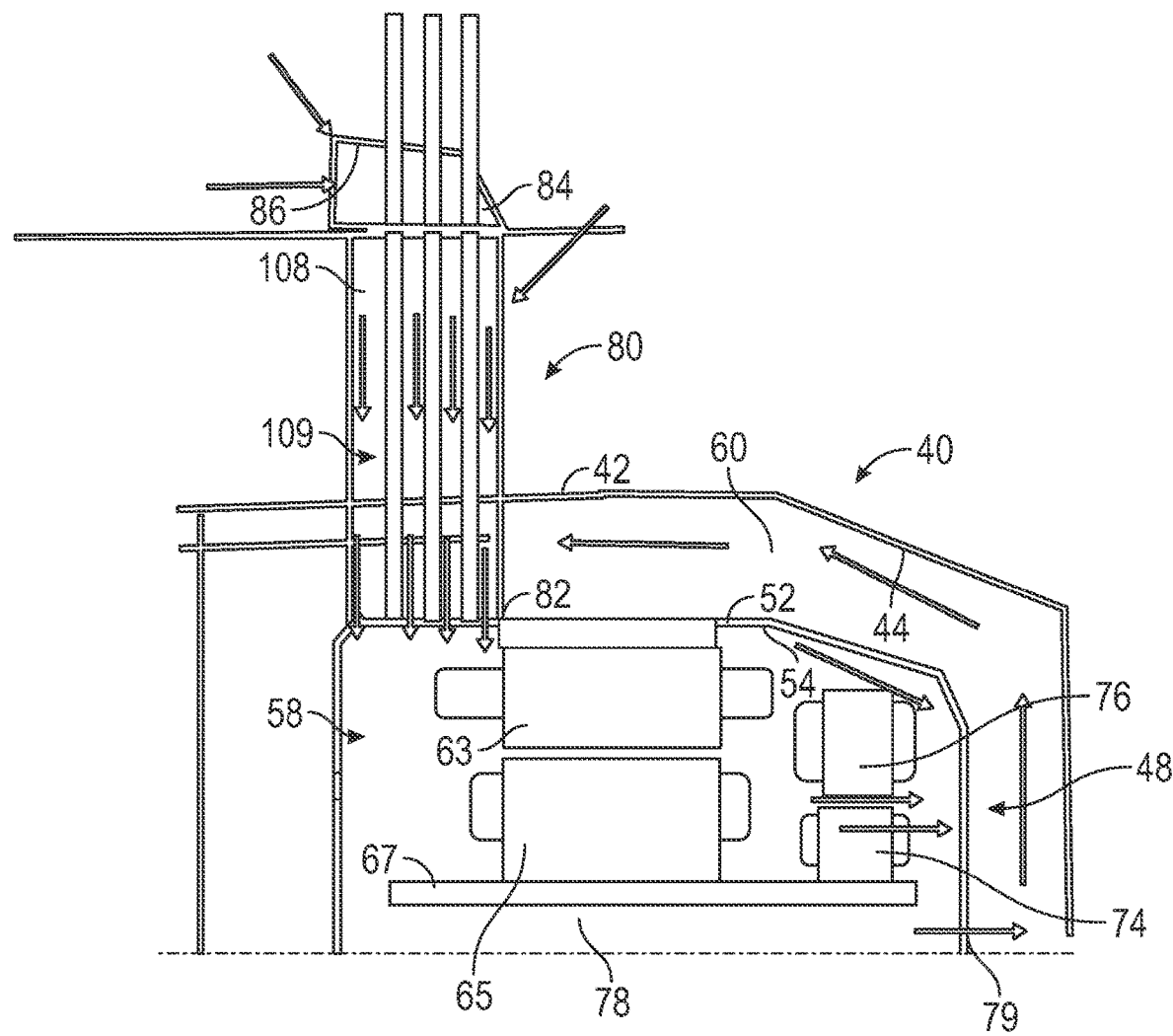
FIG. 5 is a schematic partial side view of a tail cone mounted generator including a cooling system in accordance with another non-limiting example.
Figure 6:
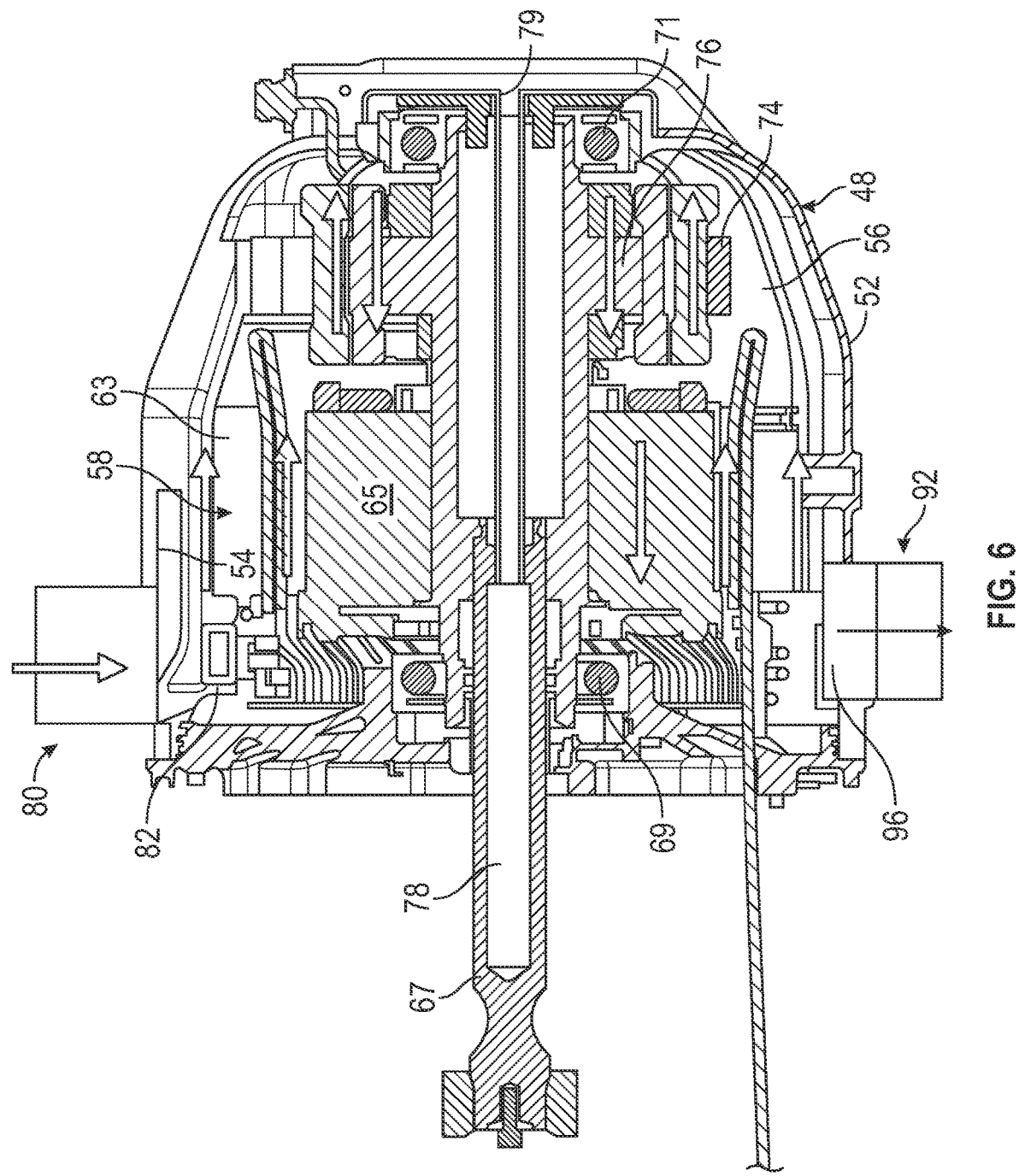
FIG. 6 depicts a cross-sectional side view of a tail cone mounted generator including a cooling system, in accordance with yet another non-limiting example.

In a non-limiting example depicted in FIG. 5, wherein like reference numbers represent corresponding parts in the respective views, first air duct 80 is shown to also act as a conduit 108 that carries electrical conductors 109 from a first terminal block (not shown) positioned on generator housing 48 to a second terminal block (also not shown) that may be arranged in nacelle 24 and or wing 14. FIG. 6 depicts a generator housing 48 in which air passes not only between stator 63/rotor 65 and secondary stator 74/second rotor 79 but also through rotor 65 and second rotor 76 in order to further improve cooling. There may be rotor cooling channels formed in rotor lamination for air to flow through the rotor and provide cooling.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An engine system comprising:
a high pressure spool;
a low pressure spool connected to the high pressure spool;
an engine duct extending about the high pressure spool and the low pressure spool, the engine duct including an outer surface section exposed to an external airstream;
a tail cone arranged radially inwardly of the engine duct, the tail cone having an outer surface and an inner surface;
a generator housing arranged in the tail cone, the generator housing including an outer surface portion spaced from the inner surface of the tail cone;
a generator mounted in the generator housing;
an air duct extending from the generator, through the generator housing, through the tail cone, and through the engine duct, the air duct including a first end arranged in the tail cone and a second end projecting outwardly of the outer surface section of the engine duct aft of the low pressure spool, the second end including an opening exposed to the external air stream passing over the engine duct; and
another air duct extending from the generator, through the generator housing, through the tail cone, and through the engine duct, the another air duct including another opening exposed to an air stream passing over the engine duct,
wherein the air duct comprises an inlet duct for directing an air flow into the generator housing and the another air duct comprises an outlet duct for directing the air flow out from the generator housing.

2. The engine system according to claim 1, further comprising: a plenum defined between the outer surface portion of the generator housing and the inner surface of the tail cone.

3. The engine system according to claim 2, wherein the outlet duct is fluidically connected to the plenum.

4. The engine system according to claim 3, wherein the generator includes a drive shaft connectable to a low pressure spool of a turbine engine, the drive shaft having a hollow interior fluidically connected to the plenum through an outlet passage.

5. The engine system according to claim 1, wherein the opening of the air duct faces a first direction relative to the engine duct and the another opening of the another air duct faces a second direction that is distinct from the first direction.

6. The engine system according to claim 5, wherein the first direction is directly opposite the second direction.

7. The engine system according to claim 1, further comprising: a plurality of electrical conductors connected to the generator, the plurality of electrical conductors pass from the generator through the air duct.

8. An aircraft comprising:
a fuselage;
a wing supported by the fuselage;
an engine system supported by the fuselage, the engine system including a turbine engine including a high pressure spool, a low pressure spool connected to the high pressure spool, and an engine duct extending about the high pressure spool and the low pressure spool, the engine duct including an outer surface section exposed to an external airstream;
a tail cone arranged radially inwardly of the engine duct, the tail cone having an outer surface and an inner surface;
a generator housing arranged in the tail cone, the generator housing including an outer surface portion spaced from the inner surface of the tail cone;
a generator mounted in the generator housing;
an air duct extending from the generator, through the generator housing, through the tail cone, and through the engine duct, the air duct including a first end arranged in the tail cone and a second end projecting outwardly of the outer surface section of the engine duct aft of the low pressure spool, the second end including an opening exposed to the external air stream passing over the engine duct; and
another air duct extending from the generator, through the generator housing, through the tail cone, and through the engine duct, the another air duct including another opening exposed to an air stream passing over the engine duct,
wherein the air duct comprises an inlet duct for directing an air flow into the generator housing and the another air duct comprises an outlet duct for directing the air flow out from the generator housing.

9. The aircraft according to claim 8, further comprising: a plenum defined between the outer surface portion of the generator housing and the inner surface of the tail cone.

10. The aircraft according to claim 9, wherein the outlet duct is fluidically connected to the plenum.

11. The aircraft according to claim 10, wherein the generator includes a drive shaft connectable to a low pressure spool of the turbine engine, the drive shaft having a hollow interior fluidically connected to the plenum through an outlet passage.

12. The aircraft according to claim 8, wherein the opening of the air duct faces a first direction relative to the engine duct and the another opening of the another air duct faces a second direction that is distinct from the first direction.

13. The aircraft according to claim 12, wherein the first direction is directly opposite the second direction.

14. The aircraft according to claim 8, further comprising: a plurality of electrical conductors connected to the generator, the plurality of electrical conductors pass from the generator through the air duct.

15. The aircraft according to claim 8, wherein the turbine engine is supported in a nacelle mounted to the fuselage.

16. The aircraft according to claim 8, wherein the wing is fixedly mounted to the fuselage.

* * * * *